(12) United States Patent
Ifarraguerri et al.

(10) Patent No.: US 11,041,754 B2
(45) Date of Patent: *Jun. 22, 2021

(54) STANDOFF TRACE CHEMICAL DETECTION WITH ACTIVE INFRARED SPECTROSCOPY

(71) Applicant: Leidos, Inc., Reston, VA (US)

(72) Inventors: Augie Ifarraguerri, Arlington, VA (US); Brian Gorin, Setauket, NY (US); J. Frank Camacho, Albuquerque, NM (US); Noah Christian, San Diego, CA (US); Robert Rice, Simi Valley, CA (US)

(73) Assignee: Leidos, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/848,922

(22) Filed: Apr. 15, 2020

(65) Prior Publication Data

US 2020/0249088 A1     Aug. 6, 2020

Related U.S. Application Data

(63) Continuation of application No. 15/979,534, filed on May 15, 2018, now Pat. No. 10,648,863.

(Continued)

(51) Int. Cl.
*G01N 21/00* (2006.01)
*G01J 3/10* (2006.01)
(Continued)

(52) U.S. Cl.
CPC ............. *G01J 3/108* (2013.01); *G01J 3/0275* (2013.01); *G01J 3/4537* (2013.01);
(Continued)

(58) Field of Classification Search
CPC ......... G01J 2003/2813; G01J 2003/423; G01J 3/0275; G01J 3/108; G01J 3/4537;
(Continued)

(56) References Cited

U.S. PATENT DOCUMENTS 4,654,530 A    3/1987 Dybwad ................. 250/347
5,173,744 A *  12/1992 Dybwad ............ G01J 3/4537
                                                    356/455

(Continued)

OTHER PUBLICATIONS

Ifarraguerri, A. I. and Jensen, J. O., "Chemical Imaging System: Current Status and Challenges," Proceedings of SPIE, vol. 4381, Algorithms for Multispectral, Hyperspectral, and Ultraspectral Imagery VII, 2001.

(Continued)

*Primary Examiner* — Dani Fox
(74) *Attorney, Agent, or Firm* — Dawn-Marie Bey; Bey & Cotropia PLLC (57) ABSTRACT

A system and process scans a target area at a distance of 3-30 m for one or more materials. Scanning is performed by a coherent transmit beam aimed with the help of a thermal camera. The active source of the beam is a supercontinuum (SC) laser. The transmitted source beam is modulated by a high-speed Fourier-transform spectrometer prior to interaction with the target. Target reflected source beam is detected by an infrared detector, along with a reference portion of the transmitted source beam, as a series of interferograms; passed through a digitizer for digitizing the interferograms; and processed to producing spectrograms, wherein the spectrograms are indicative of one or more materials on the target.

13 Claims, 7 Drawing Sheets

Related U.S. Application Data (60) Provisional application No. 62/506,218, filed on May 15, 2017.

(51) Int. Cl.
*G01N 21/359* (2014.01)
*G01J 3/02* (2006.01)
*G01J 3/453* (2006.01)
*G01J 3/42* (2006.01)
*G01J 3/28* (2006.01)
*G02F 1/35* (2006.01)

(52) U.S. Cl.
CPC .... *G01N 21/359* (2013.01); *G01J 2003/2813* (2013.01); *G01J 2003/423* (2013.01); *G01N 2201/0612* (2013.01); *G02F 1/3528* (2021.01)

(58) Field of Classification Search
CPC .......... G01N 2021/3595; G01N 21/35; G01N 21/359; G01N 2201/0612; G02F 1/3528
See application file for complete search history.

(56) References Cited

U.S. PATENT DOCUMENTS

| | | | | |
|---|---|---|---|---|
| 7,519,253 | B2 | 4/2009 | Islam | 385/122 |
| 8,055,108 | B2 | 11/2011 | Islam | 385/122 |
| 8,358,420 | B1* | 1/2013 | DeWitt | G01J 3/36 |
| | | | | 356/452 |
| 8,391,660 | B2 | 3/2013 | Islam | 385/122 |
| 8,670,642 | B2 | 3/2014 | Islam | 385/122 |
| 8,971,681 | B2 | 3/2015 | Islam | 385/122 |
| 9,077,146 | B2 | 7/2015 | Islam | H01S 5/1092 |
| 9,400,215 | B2 | 7/2016 | Islam | G01J 3/42 |
| 9,476,769 | B2 | 10/2016 | Islam | G01J 3/42 |
| 2008/0230684 | A1 | 9/2008 | Chew et al. | 250/214 AG |
| 2009/0028193 | A1 | 1/2009 | Islam | 372/6 |
| 2009/0204110 | A1 | 8/2009 | Islam | 606/9 |
| 2012/0239013 | A1 | 9/2012 | Islam | 606/3 |
| 2014/0001364 | A1 | 1/2014 | Islam | G01J 3/108 |
| 2014/0233035 | A1 | 8/2014 | Islam | G01J 3/108 |
| 2015/0008344 | A1 | 1/2015 | Islam | H01S 5/1092 |
| 2015/0104344 | A1* | 4/2015 | Webster | B33Y 30/00 |
| | | | | 419/1 |
| 2015/0247756 | A1 | 9/2015 | Islam | G01J 3/42 |
| 2016/0010971 | A1 | 1/2016 | Islam | G01B 9/02091 |
| 2016/0363482 | A1 | 12/2016 | Islam | G01J 3/108 |
| 2017/0067820 | A1* | 3/2017 | Islam | A61B 5/14532 |
| 2019/0120753 | A1* | 4/2019 | Prater | G01N 21/552 |

OTHER PUBLICATIONS

A. Ifarraguerri, "Computation of Mid-Infrared Spectra From Unequally Sampled Interferograms," Leidos, Inc., 16 pp., Apr., 2001.

Michaels, C., "Fourier Transform Spectrometry With a Near-Infrared Supercontinuum Source," Applied Spectroscopy [online], vol. 63, No. 5, 2009 [retrieved on Jul. 16, 2018], Retrieved from the Internet: URL: https://ieeexplore.ieee.org/document/5224605.

International Search Report and Written Opinion for PCT Application No. PCT/US18/32623, dated Aug. 3, 2018, 8 pp.

* cited by examiner

STANDOFF TRACE CHEMICAL DETECTION WITH ACTIVE INFRARED SPECTROSCOPY

CROSS-REFERENCE TO RELATED APPLICATIONS

The present application is a continuation of U.S. application Ser. No. 15/979,534, filed May 15, 2018, titled "Standoff Trace Chemical Detection With Active Infrared Spectroscopy," which claims benefit of priority to similarly titled U.S. Provisional Patent Application No. 62/506,218, filed May 15, 2017, both of which are incorporated herein by reference.

GOVERNMENT FUNDING STATEMENT

Embodiments disclosed herein may have been conceived or first actually reduced to practice in performance of work under the following Government funding vehicle: IARPA, under Contract No. FA8650-16-C-9107. As a result, the Government may have certain rights to those embodiments.

BACKGROUND

There remains a need for the ability to detect chemicals from a stand-off position across numerous industries and applications including, but not limited to: forensic crime scene analysis; border, checkpoint, portal and facility protection; cargo and facility screening and inspection; surveillance; and even stockpile and production monitoring. Specifically, applications requiring or benefitting from chemical detection include, for example: screening of people, vehicles, cargo as they attempt to cross borders, enter checkpoints and enter public or other high traffic facilities including airports, train stations, sports and/or concert venues, office buildings, shopping centers and the like; detection of residue or pre-cursor or constituent materials from explosives, poisons, narcotics or other hazardous materials; tracking people and things through surveillance.

However, current systems do not provide the sensitivity, specificity, and low false-alarm rates that are needed to enable effective use in a cluttered, real-world environment. Current techniques for detecting chemicals in the field range from collecting samples and transporting them back to a laboratory for analysis, to small point sensors that alert to the presence of a single chemical or chemical class, to passive or active optical sensors that can search the ground for chemical targets from an airborne platform. Each different chemical detection method has both strengths and limitations.

Laboratory analysis techniques such as Nuclear Magnetic Resonance spectroscopy (NMR), mass spectrometry, Fourier Transform Infrared (FTIR) spectroscopy, and various forms of chromatography provide precise chemical identification from very small quantities of sample material. But there is a time lag of hours to days for a sample to be collected and transported to the laboratory and collecting enough samples to comprehensively analyze large areas for trace surface residues is cost and time prohibitive. Field-portable versions of several of these techniques do exist, which reduce analysis time to minutes, but to test for surface residue samples must still be collected by wiping or swabbing the surface(s) of interest. Also, the sensitivity and specificity of field-portable instruments is significantly lower than the performance capability of their laboratory counterparts.

Optical spectroscopy based standoff techniques are the most viable approach for rapid, high area coverage chemical detection of trace residues on surfaces. But while a number of existing standoff optical spectroscopy techniques such as fluorescence spectroscopy, differential absorption light detection and ranging (DIAL), Raman spectroscopy, and laser induced breakdown spectroscopy (LIBS) offer either high sensitivity or high specificity, none can simultaneously provide the needed performance metrics in both categories. Many optical standoff techniques also have additional drawbacks, such as eye safety concerns.

Existing infrared hyperspectral imaging field techniques can identify chemicals in limited cluttered environment cases but cannot simultaneously achieve the required sensitivity and selectivity levels needed for most applications. In contrast, the basic physics of active IR absorbance and reflectance spectroscopy at the needed sensitivity and selectivity levels is well developed for laboratory environments. FTIR spectrometers can rapidly and efficiently analyze gas, liquid, and solid phase samples with $0.1$ $cm^{-1}$ or better spectral resolution and standard sensitivities typically 10-100 times higher than many application requirements for trace chemical detection. However, translating the performance of state of the art IR spectrometers to a portable, active standoff capability is currently limited by a number of factors related both to the spectrometer itself, and the post-acquisition spectroscopic analysis needed to extract chemical identification information from a multi-component high resolution absorption or reflectance spectrum.

With respect to the spectrometer, current standoff active IR techniques are limited by sources and detectors. There have historically been two choices for active illumination: broadband incoherent light sources that require large collimating optics and have limited range, or narrow-band coherent sources that limit spectral coverage and therefore sensitivity. In addition, dispersive spectrometer-based detection, used with many current passive and actively illuminated systems, intrinsically trades signal-to-noise (SNR), resolution, and scan speed, because the collected photons must be dispersed and separated into individual resolution elements prior to detection.

For example, open-path FTIR relies on efficient retroreflectors that preserve the transmitted energy and use large collimating optics to project the thermal energy of the infrared source. Even with these advantages, large apertures are still required. To project five orders of magnitude more energy on to a target than a standard open-path system, it is necessary to use lasers. Possible configurations include tunable lasers that scan the spectrum over time, dense frequency combs that generate a multitude of narrow lines, and super-continuum (SC) lasers that produce spectrally continuous output. Tunable laser sources in the mid-IR have been around for many years. Frequency-agile $CO_2$ lasers use gratings to switch among the multitude of lines generated by the source. QCLs represent the new generation in mid-IR laser sources. They offer better efficiency than $CO_2$ and broad tunability. QCLs can be made to cover all parts of the mid-IR and beyond. A tunable laser-based system scans the spectrum by quickly switching wavelengths over its "tuning range," so a sensor that relies on it would be very simple, only requiring a broadband detector because the spectroscopy is built into the source. The disadvantage of tunable source-based systems is that by only illuminating one line at a time, the overall efficiency is very low compared with a source that can illuminate many wavelengths at once.

Dense frequency combs can be generated with QCLs. Assuming that the power per line is the same as with a tunable source, combs have an efficiency advantage of a factor equal to the number of lines over the tunable source, at the expense of complexity in the receiver, which must now perform the spectroscopic function (or by modulating the source—either way, complexity is unavoidable). However, they are still discrete by nature and therefore only provide information on the spectral lines for which they are designed. Unlike frequency combs, SC sources are continuous and thus their output energy interacts with all of the absorption lines from the materials it encounters. The disadvantage of SC sources has been the requirement for pulsed lasers, unlike $CO_2$ or QCL lasers, which are continuous-wave, but with the availability of fast detectors and electronics, the present embodiments capture the individual pulses and reject the background energy while reducing the detector noise via shorter integration times.

Accordingly, there remains a need in the art for a system for standoff detection and identification of trace chemical residues on surfaces using active infrared spectroscopy at a distance. A preferred system would feature portability and real-time results with high chemical sensitivity and specificity across a broad range of target classes and effective operation in a real-world environment accounting for issues such as gas phase and surface-adsorbed clutter, varying substrates, temperature, humidity, indoor/outdoor background light.

SUMMARY

The present embodiments aim to overcome these limitations by coupling broadband coherent sources with interferometric spectroscopy. This completely new type of sensor combines the functionality of an open-path FTIR spectrometer with that of a surface chemical probe. The system consists of a pulsed supercontinuum (SC) laser source, a high-speed compact FTIR spectrometer, optical transmitter, telescope, high-speed infrared detector and a computer processor. The supercontinuum laser light is scanned over the field of view. In a preferred, though non-limiting embodiment, the covering SC laser covers the 2-12-micron spectral range. The high-speed FTIR spectrometer is synchronized to the source so that the pulses are captured, and the spectrum measurements coincide with the individual scan positions of the source. A small portion of the transmitted energy from the source is tapped and directed to the spectrometer without exiting the sensor to serve as a reference. The computer processor converts the raw data to target and reference spectra.

In a first embodiment, a stand-off chemical detector for detecting one or more materials on a target, the detector includes: a pulsed supercontinuum (SC) laser source operating in the infrared spectrum for generating a source pulse beam for target illumination; an interferometric device for spectrally modulating the source pulse beam; an optical transmitter for directing the spectrally modulated source pulse beam to the target and sampling the source pulse beam to obtain a source reference measurement signal; an optical receiver for collecting a reflected source pulse beam from the target and the source reference measurement signal from the optical transmitter; at least one infrared detector for detecting the target reflected source pulse beam and the source reference measurement signal as a series of interferograms; a digitizer for digitizing the interferograms; and a processor for producing spectrograms from the digitized interferograms, wherein the spectrograms are indicative of one or more materials on the target.

In a second embodiment, a stand-off chemical detector for detecting one or more materials on a target, the detector includes: a pulsed supercontinuum (SC) laser source operating in the infrared spectrum for generating a source pulse beam for target scanning; an interferometric device for spectrally modulating the source pulse beam prior to interaction with the target; and a detector for receiving a reflected source pulse beam, wherein the reflected source pulse beam includes spectral information for detecting one or more materials on the target.

In a third embodiment, a process for scanning a target located at a distance of at least 3 meters from a stand-off detector to detect one or more materials thereon, includes: scanning the target with a source pulse beam emitting in a spectral range of approximately 2 to 12 µm generated by a supercontinuum (SC) laser source, wherein prior to reaching the target, the source pulse beam is spectrally modulated by a refraction-based interferometric modulator and sampled by an optical component to obtain a source reference measurement signal; receiving at an optical receiver a reflected source pulse beam from the target and the source reference measurement signal from the optical component; detecting by at least one infrared detector the target reflected source pulse beam from the target and the source reference measurement signal source reference measurement signal as a series of interferograms; digitizing the interferograms by a digitizer; and processing the interferograms to produce spectrograms to detect the inclusion of one or more materials on the target.

FIGURES

The following figures are intended to be read in conjunction with the Detailed Description below.

DETAILED DESCRIPTION

The embodied system is directed to a standoff chemical analyzer capable of detecting and identifying trace amounts of solids, liquids, and vapors from distances in the 10s of meters. There is no device at present that can unambiguously detect materials on surfaces at the 0.1 µg/cm² level from a distance. Such a sensor is highly significant in that it provides the ability to probe surfaces for contamination unobtrusively from a safe distance, scan people and vehicles for illicit substances, and monitor effluents from buildings without the need for a retro-reflector or line of sight to the sky.

In a preferred embodiment, the system scans a 1 m×1 m target area at a distance of 3-30 m. Scanning is performed by the coherent transmit beam aimed with the help of a thermal camera, while the receiver subtends the full target area being scanned, which is possible because the pulsed signal is detected via changes relative to the thermal background so that the ambient background radiance is invisible to the sensor. Dividing the target area into subsections directly improves our signal-to-clutter performance by increasing the proportion of the signal originating from the target (e.g., surface contaminant) relative to background materials where the material of interest only covers a small area (square centimeters) or is not uniformly distributed. The target is scanned in any number of grid configurations up to 30×30 over a 15-second measurement period, as a single field of view for maximum sensitivity, or even adaptively to implement a detect-and-confirm strategy if desired. The active source is a supercontinuum (SC) laser. In specific alternative embodiments, the SC laser may include adjustable beam divergence. The transmitted light is modulated by a high-speed Fourier-transform spectrometer chosen for its compatibility with the proposed system described below.

We address the spectral region from 2-12 μm (800-5,000 cm-1). The short wavelength bound is chosen to coincide with the atmospheric water absorption edge. Shorter eye-safe wavelengths from 1.4-1.8 μm also contain chemical information, but these are almost all weak overtones. The shorter wavelengths from 2-2.5 μm are useful in analyzing bulk solids because the lines tend to not fully saturate as they might at longer wavelengths.

Figure 1:
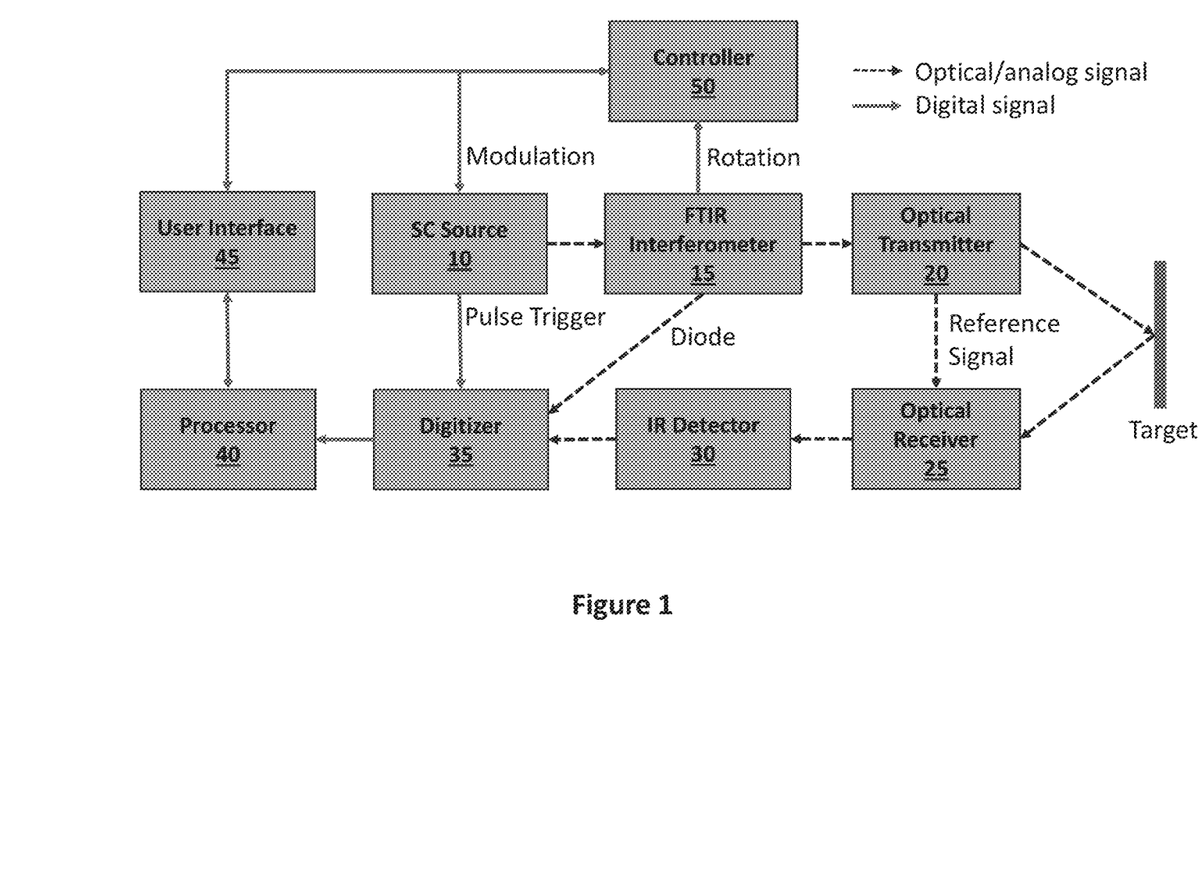
FIG. 1 is an exemplary schematic of components and functions of an embodied system.

General components of an exemplary embodiment are depicted in FIG. 1 which comprises several major electro-optical sub-systems: supercontinuum ("SC") fiber laser source 10; FTIR interferometer 15; optical transmitter 20, including transmit optics and scanner; optical receiver 25, e.g., receive telescope; IR detector 30; signal digitizer 35; processor 40; and user interface 45 and controller 50 for control and display. The mechanical design and materials are selected to mitigate stray light, enable thermal management, and be light-weight.

Figure 2:
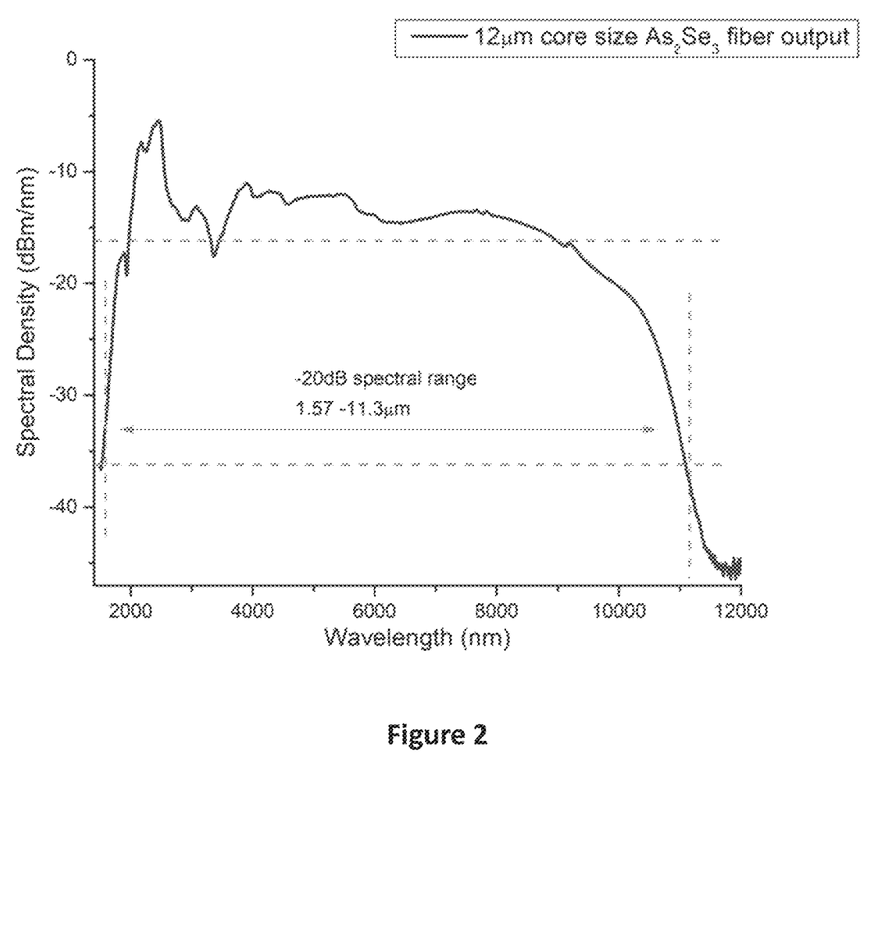
FIG. 2 provides an exemplary power spectrum of the SC laser source.

In a preferred embodiment, a SC laser source delivers broad-spectrum light to the surface of interest. FIG. 2 provides an exemplary output spectrum from a source that has been used for this purpose. SC lasers combine the spatial coherence properties of lasers with broad spectral emission and high brightness. Unlike a high-temperature source, the SC laser beam can be collimated with relatively small optics and projected on a distant target with low divergence. The propagation of the SC source is limited by the atmosphere (turbulence, scattering, and absorption). By way of example, Omni Sciences, has developed a mid-infrared SC laser (MISCL) with a 5.2-W output that spans the 2-4.3 μm wavelength range. The Omni Sciences fiber laser architecture is a platform where SC in the visible, near-infrared, or mid-infrared can be generated by appropriate selection of the amplifier technology and the SC generation fiber. Various aspects and embodiments of the technology are disclosed in the following U.S. Patents and published applications which are incorporated herein by reference in their entirety: U.S. Pat. Nos. 7,519,253, 8,055,108, 8,391,660, 8,670,642, 8,971,681, 9,077,146, 9,400,215, 9,476,769, US20090028193, US20090204110, US20120239013, US20140001364, US20140233035, US20150008344, US20150247756, US20160010971, US20160363482 (hereafter "SC Patents"). In addition to these patents, two academic papers describe additional aspects of the source technology: Martinez, R. A., et al, "Mid-infrared supercontinuum generation from 1.6 to >11 μm using concatenated step-index fluoride and chalcogenide fibers," Optics Letters, vol. 43, no. 2, pp. 296-299, 2018; and Guo, K., et al, "Generation of near-diffraction-limited, high-power supercontinuum from 1.57 μm to 12 μm with cascaded fluoride and chalcogenide fibers," Applied Optics, vol. 57, no. 10, pp. 2519-2532, 2018.

The output of the SC source is optically collimated and run through the interferometric device for modulation at varied optical path differences (OPDs). The three primary methods for performing spectroscopy are dispersive (using gratings or prisms), interferometric, or tunable filters. Interferometric methods for spectral measurement have many classical advantages over dispersive and tunable filter instruments. These advantages include Jacquinot's advantage, or throughput advantage, because of the lack of any entrance slit; and Fellgett's advantage, or the multiplex advantage, which is a result of all resolution elements being observed all the time. FTIR uses an interferometer (typically a Michelson, Mach-Zehnder, or Sagnac configuration), where two optically varied path lengths are used to collect the individual points of the interferometric series. This series of intensities with varied path-length differences is collected at a detector as an interferogram. The interferogram is Fourier-transformed to obtain the spectrum of light entering the interferometer. Traditionally, in a Michelson configuration, the mirror placement is performed using a linear motor on a mirror to obtain the varied mirror retardations, i.e., reflective scanning, but in the preferred embodiment discussed herein, the interferometry is enabled by a configuration that utilizes refractive scanning through an innovative rotational displacement of a refractive optical element as described in U.S. Pat. Nos. 4,654,530 and 5,173,744, which are incorporated herein by reference in their entirety. This rotation can be accomplished at high speed, and the interferometer has significant advantages in speed, size, weight, and power over traditional moving-mirror interferometers.

As the refractor rotates, light self-modulates creating interference fringes. In the preferred system, these fringes are sampled to form an interferogram. In order to obtain a spectrum that includes frequencies up to 5000 cm$^{-1}$ with 4 cm$^{-1}$ resolution, at least 6000 interferogram points per scan are needed over a 30° arc of rotation. At the maximum rotation rate of 25 Hz, this translates to a preferred interferogram sampling rate of 1.8 MHz.

A mathematical model that predicts the OPD for a given refractor angle is available. For the preferred embodiment, this model predicts a non-linear relationship between the OPD and rotor angle. The SC laser source produces pulses at a constant frequency, which translates to constant angular sampling for a given refractor rotation rate, and therefore the OPD sampling is non-linear. An internal CW reference laser, e.g., diode laser, of well-known wavelength provides a signal that is measured concurrently with the pulses to provide information on the actual OPD at the time of each pulse. The theoretical basis for this approach is discussed in Attachment A of U.S. Provisional Patent Application No. 62/506,218 which is incorporated herein by reference and to which the present application claims the benefit of priority.

Alternatives to moving-mirror or moving-refractor FTIR instruments include the use of fixed interferometers (Fabry-Perot or Sagnac), selective or multiple etalons (Fabry-Perot and variants), and holographic instrumentation (virtually imaged phase array [VIPA] or VIPA etalons). These may be used in alternative embodiments, but the TurboFT or equivalent refractive scanning instrument is preferred, even with the integration risk of a pulsed laser source, because it provides significant advantages over these other approaches. Fixed interferometers are sufficient when a narrow spectral range needs to be identified, but are not useful for collection of full spectra from 2-12 µm. Grating spectrometers do not have the throughput, wavelength, and multiplex advantages that an FTIR has, and even a dispersive arrayed instrument requires an incoming slit that limits throughput. In addition, the dispersive arrayed system does not have the equivalent resolving power and resolution that the FTIR has, and the resolving power is not linear over the wavelength range. Holographic (e.g., VIPA) arrays offer an intriguing approach to solving some of the dispersive instrumentation issues by not requiring an entrance slit and thus permitting a theoretically comparable throughput advantage to FTIR instrumentation. Furthermore, with no moving parts, very high resolutions (down to tens of GHz) can easily be obtained. However, they are currently limited in terms of total spectral range, much like Fabry-Perot instruments, when compared with FTIR.

The modulated light from the interferometer is guided by the optical transmitter to the target some distance away (typically 3-30 meters). In anticipation of the spectral variability of the SC laser source over time, a small fraction of the light from the interferometer is sampled and directed to the detector, arriving earlier than the delayed pulse from the target. This signal allows for the proper correction of the measured target spectrum.

The optical receiver gathers light returning from the target and directs it to the detector. In the preferred embodiment, the low-speed detector assembly of the TurboFT product may be replaced with a high-bandwidth detector to obtain fast temporal response while maintaining detectivity. The preferred detector is a high-speed photoconductive mercury/cadmium telluride (MCT) system with four-stage thermoelectric cooling. This technology offers the best combination of low noise, high accuracy, and high speed with a straightforward detection and amplification scheme. The detector sensitivity is optimized for 2-12 µm detection. One skilled in the art recognizes that alternative detectors may be used. An exemplary detector is the Vigo PCI-4TE-12 with expanded bandwidth.

The signal from the detector is digitized, resulting in a pulse pair (one reference pulse and one target pulse) for each OPD. The delay between the reference and reflected pulses indicates the distance to the target. In a preferred embodiment, data acquisition is achieved using a two-channel digitizer (e.g., U5303A digitizer from Acqiris (formerly Keysight)) that is able to capture up to 2 GS/s per channel with 12-bit depth. In an exemplary configuration, one channel is used for the detector signal while the other is used to capture the signal from the spectrometer's internal reference diode laser. The channels are synchronized by a common clock, which allows us to match the source pulse times with reference diode for calculating the Fourier transform.

The 12-bit quantization provided by the digitizer is sufficient assuming that the signal range is near-optimally matched to the digitizer. As the target reflectance increases from the derivation point, the digitizer quickly saturates. The preferred embodiment implements a dynamic gain adjustment strategy that relies on multiple scans for each target location. If saturation is detected in the first scan, it is discarded, and the gain is lowered to prevent saturation in the following scan. This procedure is repeated until no saturation is detected. Because the brighter targets return more signal than the darker ones, discarding the saturated scan does not affect the SNR or the time requirements.

In order to limit the data volume, a signaling scheme may be used whereby the source produces a trigger signal each time a pulse is generated. This signal serves to trigger data acquisition, which then takes place over a fixed number of samples. For each pulse trigger, the digitizer is programmed to collect a fixed number of samples at the maximum acquisition rate so that the short pulses can be captured. The number of samples must be sufficiently large to capture both the reference and target (return) pulses, which are separated in time by anywhere from 20 to 300 nanoseconds depending on the distance from the sensor to the target. For example, in a preliminary configuration, 400 samples (200 nanoseconds) are collected to ensure that (1) both the reference and target pulses were captured and (2) there are enough data points from the internal reference diode to reconstruct the full signal in spite of gaps.

Each sample collected to create an interferogram consists of a single pulse. The total energy of the pulse (the area under the curve) gives the desired value of the interferogram point. A collection of pulses is processed to estimate their total energy, thus creating the interferogram. A Fourier transform (FT) is applied to each interferogram to obtain the "raw" spectra for the reference and target signals. Using the pair of spectra along with the calibration procedure described below, the apparent reflectance of the target material (including any contaminants) is estimated.

Figure 3:
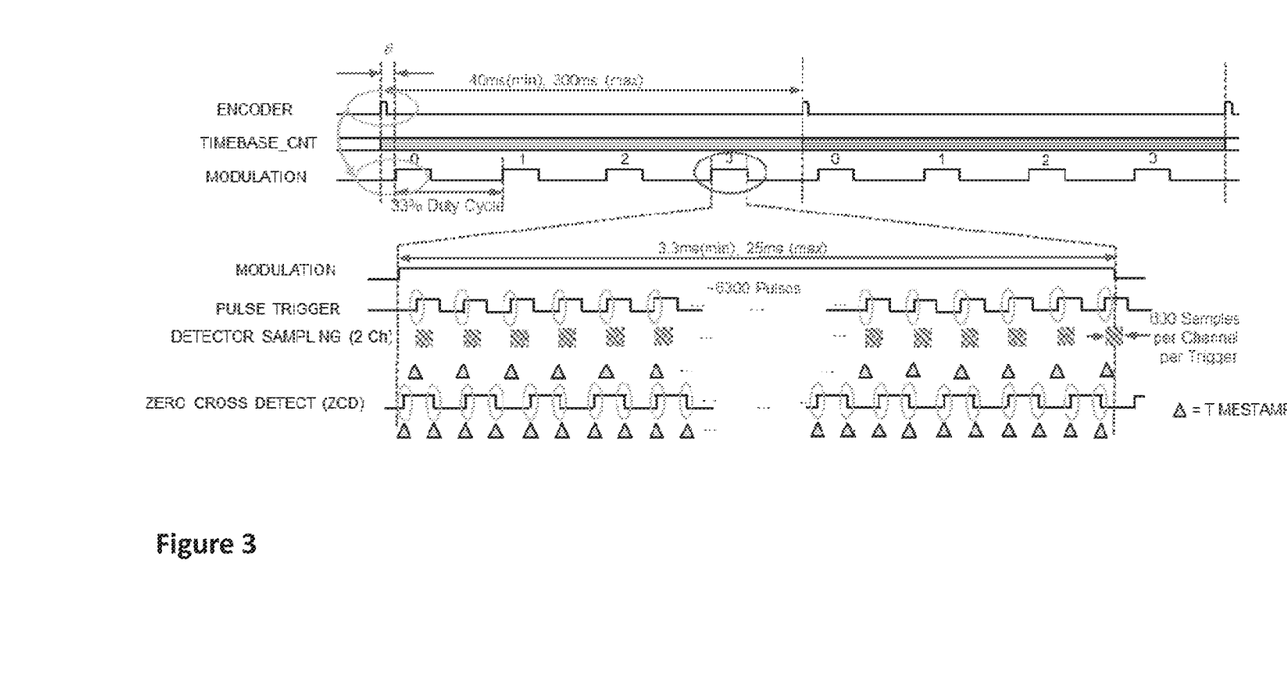
FIG. 3 shows the signaling timing diagram for the preferred embodiment.

The sensor uses a relatively simple signaling scheme to synchronize the pulsed laser source and data acquisition. The source operates at a constant pulse rate but can be externally modulated. FIG. 3 shows the timing diagram for the preferred embodiment. The main driving signal is a 1/revolution encoder pulse from the TurboFT spectrometer motor, which in turn produces a custom on/off modulation signal for the source through an arbitrary function generator. There are four modulation cycles per rotation, corresponding to the four positions of the rotor that produce an interferogram (for each 90° quadrant of rotation there is a 30° arc over which an interferogram is produced). The arbitrary function generator is programmed with the appropriate timing information, which is tied to the rotation rate. The source is enabled by the rising edge of each modulation signal and turned off by the falling edge.

Figure 4:
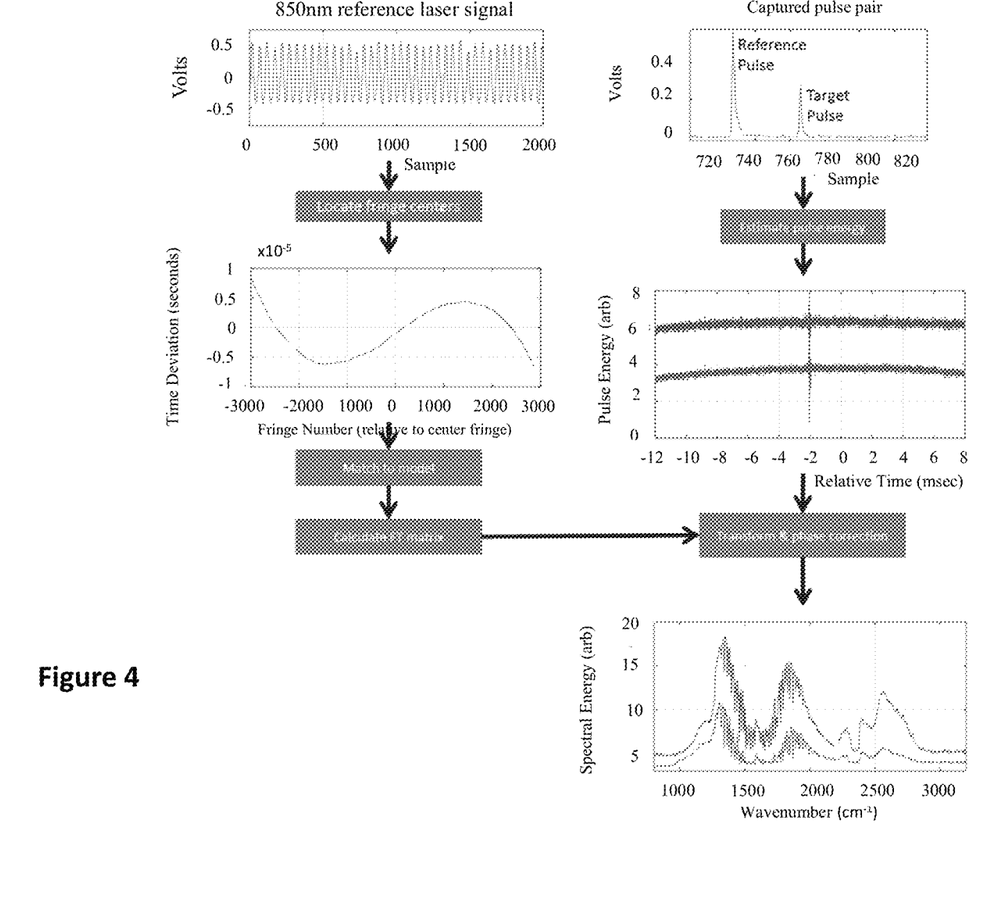
FIG. 4 illustrates the signal processing chain used to calculate the spectrum from the raw interferogram data.

FIG. 4 shows the overall processing pipeline starting with the acquisition of a set of records (sample sequences containing pulse pairs) corresponding to 1 modulation cycle of the source, which is typically set for at least 6000 pulses. For each record, the reference and target pulses are segmented using a fixed time delay (the algorithm assumes that the target is always far enough that the pulses do not overlap). The pulse energy is estimated by numerical integration. The result is a pair of interferograms. In parallel to the pulse processing, the signal from the reference 850 nm internal diode laser is captured for use in estimating OPD at the exact time of arrival of each pulse by the processing described below.

We calculate the infrared energy spectrum from the interferogram using the Mertz method (not described here as it is known to those skilled in the art) with triangular apodization. Because of the nonlinear effect described above, the interferogram sampling is non-uniform in OPD and therefore the conventional Fast Fourier Transform algorithm cannot be used. We instead calculate a full Fourier transform (FT) matrix, where each term is given by the formula:

$$F(v,\alpha) = e^{-i2\pi v \times OPD(\alpha, n(v))}$$

Here, $v$ is the wavenumber in $cm^{-1}$ and $\alpha$ is the refractor angle associated with each interferogram sample. The function $OPD(\alpha, n(v))$ has units of centimeters and is calculated in accordance with the discussion below. The parameter $n(v)$ is the wavenumber-dependent index of refraction of the refractor. Although slower, when using the full matrix, we can skip calculation of unneeded spectral bands (i.e., the matrix does not have to be square), and the spectral sampling does not need to be uniform.

To obtain the OPD values, we use a combination of measurement and modeling. The captured reference 850 nm diode laser data provides the information to determine the center time stamp for each fringe and identify the "central fringe" where the OPD is zero. Each fringe away from zero (in both positive and negative directions) corresponds to an OPD change equal to the wavelength of the reference laser. If we assume that the refractor is rotating at a constant angular rate, then we can derive an empirical curve of OPD vs. angle for the diode. We compare this curve to one predicted from the mathematical model to adjust the nominal rotation rate (which may vary by a few percent over time) so that the model and data match optimally (in the least squares sense). This allows us to get an agreement between measurement and theory of better than 1 part in 10000 in OPD. The model then allows us to calculate the OPD at any angle and refractive index value. A more detailed discussion can be found in Ifarraguerri, A. I. and J. O. Jensen, Chemical imaging system: current status and challenges. Proceedings of SPIE, 2001. 4381 (Algorithms for Multispectral, Hyperspectral, and Ultra spectral Imagery VII) which is incorporated herein by reference.

In order to achieve real-time performance with, for example, a maximum scanning rate of 100 spectra per second, the preferred embodiment may incorporate low-power embedded processors. As the "lowest" level of processing, the pulse energy estimation may be implemented on a field-programmable gate array (FPGA) connected directly to the digitizer circuit. The FPGA can be equipped with dynamic memory to hold the pre-computed pulse shapes, which could be externally updated by the main processor at regular intervals if needed. That leaves the centroid and regression floating point calculations to be implemented.

FPGA implementation may also be used to find the timestamps for the reference diode laser fringes. The required operations involved are simple and repetitive (finding zero-crossings, counting cycles, and linearly interpolating). An exception to FPGA processing is finding the central fringe, which requires a complex polynomial fit, better suited to a central processor.

Further, the spectrum calculation may be implemented on a graphics processing unit (GPU), where the matrix elements can be computed in parallel.

The working model for the portion of the signal derived from the active source is:

$$S_R(\upsilon)=S_T(\upsilon)\Omega t(\upsilon)^2 r(\upsilon)$$

where v is the wavenumber in cm$^{-1}$, $S_R(\upsilon)$ represents the spectral power density at the receiver aperture, and $S_T(\upsilon)$ is the transmitted spectral power density. $\Omega$ is the fraction of the hemisphere subtended by the receiver aperture, which is known by measuring the distance from the sensor to the target. The variables $r(\upsilon)$ and $t(\upsilon)$ represent the reflectance of the target (as modified by any contaminant) and the transmittance of any intervening atmosphere, including the effects of vapors of interest. This model assumes that the surface with reflectance $r(\upsilon)$ is mostly diffuse and thus largely insensitive to illumination angle. Any specular component that is present can only be seen if the surface is close to normal to the sensor line of sight, or if it has retro-reflective properties from shape or texture. In that case, the term $\Omega$ is not a function of range and may be close to 1, which saturates the receiver. As discussed previously, the preferred embodiment implements a dynamic gain adjustment strategy that relies on multiple scans for each target location. If saturation is detected in the first scan, it is discarded, and the gain is lowered to prevent saturation in the following scan. This procedure is repeated until no saturation is detected.

To estimate the target reflectance, the raw target spectrum $S_T(\upsilon)$ is divided by another spectrum $S_{SM}(\upsilon)$ that is calculated from the reference spectrum $S_R(\upsilon)$ via the equation:

$$S_{SM}(\upsilon) = \sum_m C(\upsilon, \omega)S_R(\omega)$$

where $C(\upsilon, \omega)$ is a calibration matrix (2D array). $S_{SM}(\upsilon)$ represents the best estimate of the spectrum of a standard target material, which would not necessarily be available for measurement in the field. The ratio of $S_T(\upsilon)$ to $S_{SM}(\upsilon)$ is then multiplied by the known reflectance of the standard material to produce the best estimate of the target reflectance. To obtain the matrix $C(\upsilon, \omega)$, we collect a sequence of measurements with the standard material at or near the expected range of the target (multiple sequences can be collected to cover multiple ranges). In the preferred embodiment, the standard material is a diffuse gold-coated target such as InfraGard® which has high reflectivity at all bands. From this data, consisting of raw spectrum pairs obtained as described above, we estimate $C(\upsilon, \omega)$ using the Partial Least Squares method known to those familiar with the art. We find that in practice, 10 measurements over a period of an hour are adequate to capture the variability in the source and the atmosphere.

Figure 5:
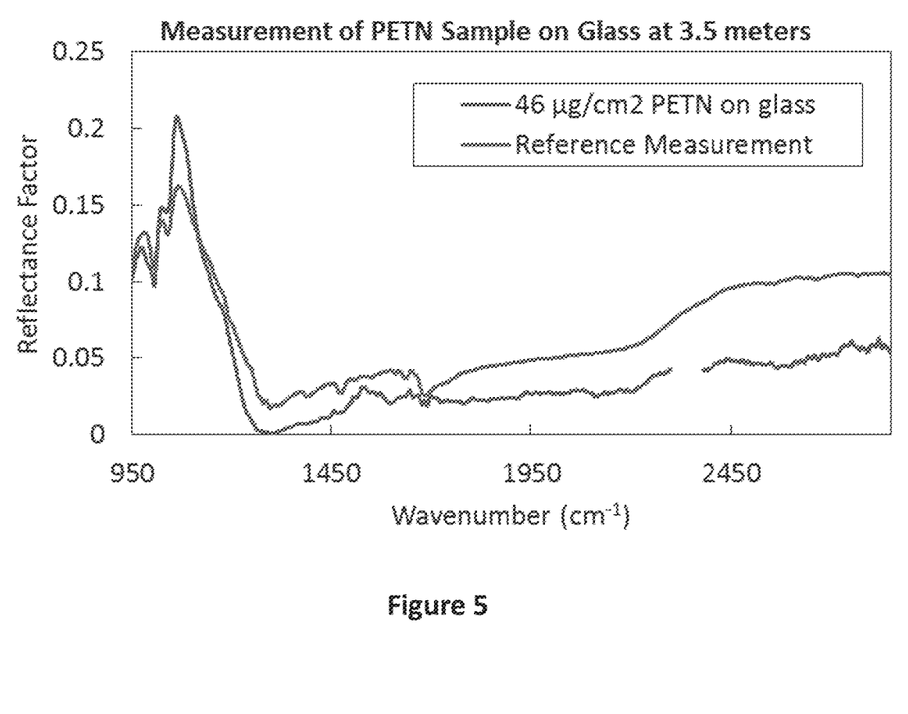
FIG. 5 illustrates the spectral match between a measured sample of pentaerythritol tetranitrate (PETN) and a reference measurement collected with a conventional laboratory instrument.

The estimated reflectance of the target provides the chemical information needed to perform material identification. This can be done via an appropriate spectral matching algorithm such as Adaptive Coherence Estimation (ACE), Spectral Feature Fitting, or Probabilistic Identification of Solid Materials (PRISM). FIG. 5 provides an illustration of a spectral match between a measured sample of pentaerythritol tetranitrate (PETN) and a reference measurement collected with a conventional laboratory instrument. It can be clearly seen that the spectral features overlap, demonstrating the ability of our invention to detect and identify infrared-active materials.

Figure 6:
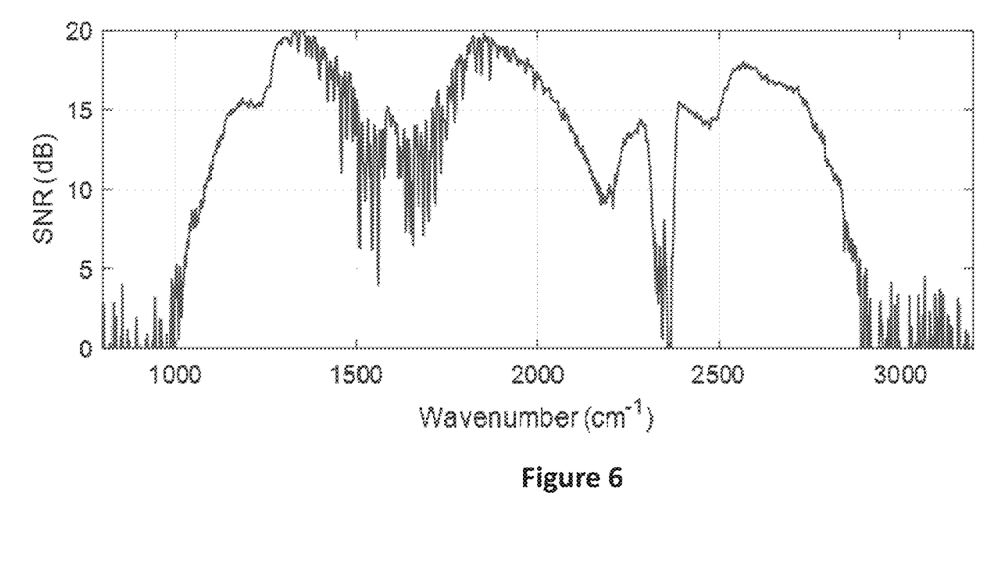
FIG. 6 shows the exemplary spectral SNR achieved by the preferred embodiment standoff system.

The critical performance metrics for the standoff system are the signal-to-noise ratio (SNR) and spectral frequency calibration accuracy. The sensor spectral resolution is fixed, and the spectral coverage is limited by either the source spectrum or the detector spectral response. At a given source power level and target range, the SNR measures how well the testbed system is able to capture and maintain the optical signal. Several different SNR measurements were performed. The pulse SNR is the ratio of the maximum pulse voltage to the root-mean-square (RMS) noise voltage seen by the acquisition system when no pulses are transmitted. The final pulse SNR was 26 dB. The pulse SNR is a coarse metric that provides little insight into the spectral performance. For that we use a spectral SNR, which is the ratio of the reference spectrum to the out-of-band noise standard deviation. The spectral SNR achieved by the preferred embodiment standoff system is provided in FIG. 6. On the low frequency end, the SNR is limited by the source power spectrum. At high frequencies, the limitation is due to the detector responsivity.

Figure 7:
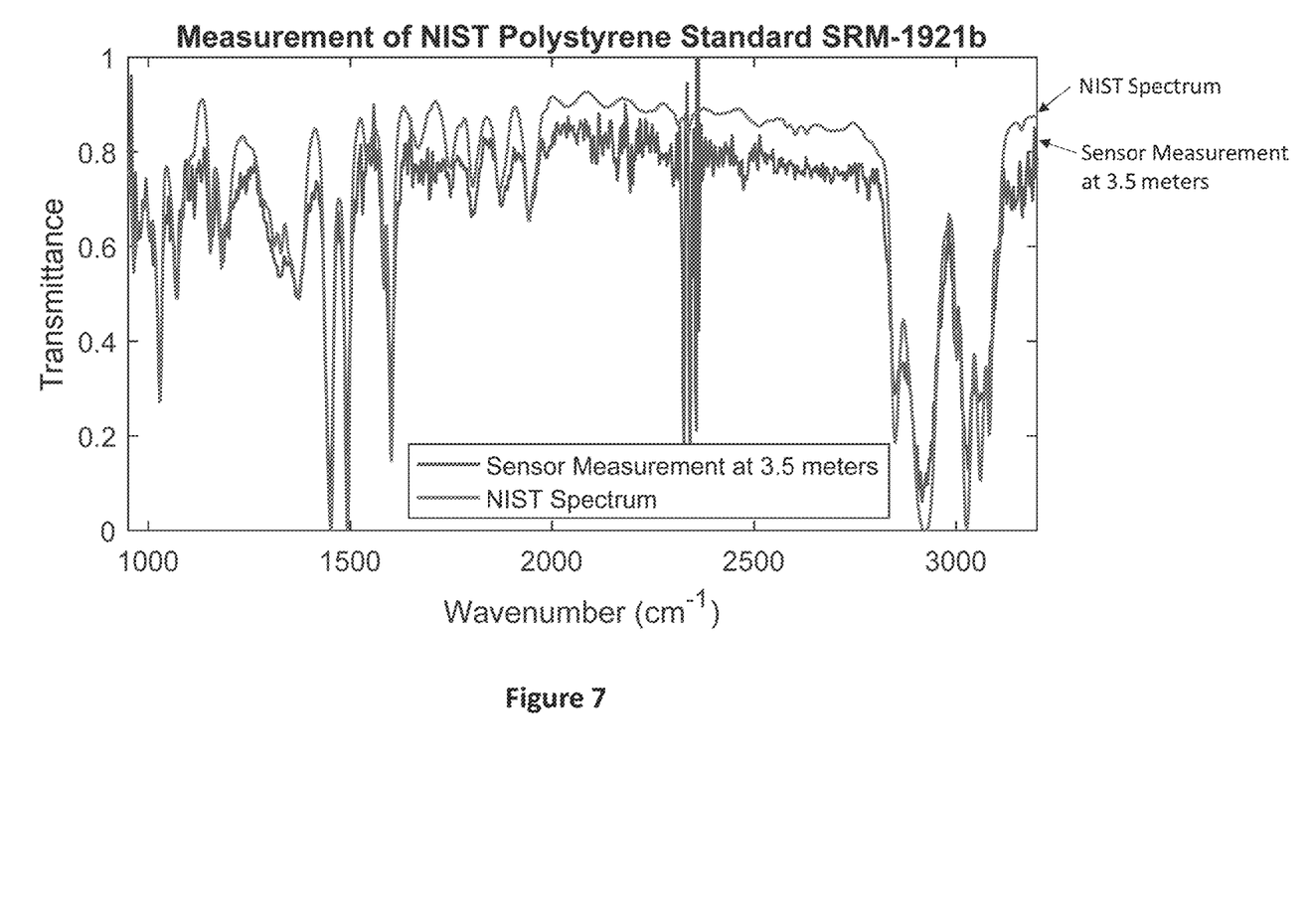
FIG. 7 shows the measured spectrum of polystyrene by the system of the preferred embodiment, compared to the standard transmission spectrum from NIST.

The spectral (frequency) accuracy of an FTIR depends on accurate knowledge of the OPD at each sample. For the modified TurboFT, we use the internal reference laser signal to extract the OPD information to a high degree of accuracy, plus we account for the spectral variation in the refractive index in order to obtain the correct spectral scale. FIG. 7 shows the measured spectrum of polystyrene by our system, compared to the standard transmission spectrum from NIST. The strong overlap of the spectral features indicates that our FT matrix calculation provides correct results. Note that we are able to at least partially reconstruct spectral features that fall within the atmospheric absorption windows. This is a promising and unexpected result.

The system and process described herein may be used to detect numerous materials from a standoff position, including but not limited to: explosives such as Nitro-based compounds PETN and RDX, newer formulations such as acetone peroxide, and home-made explosives such as fertilizer bombs; chemical weapons and poisonous or toxic chemicals such as Sarin or Tabun, newer non-traditional agents, and toxic chemicals that may be intentionally or unintentionally released such as hydrogen cyanide or ammonia gas; Narcotics such as illicit drugs cocaine, heroin, or methamphetamine, or legal but abused drugs such as Vicodin or hydrocodone; and secondary targets including compounds associated with the manufacture and deployment of biological agents and nuclear materials.

The embodiments described and claimed herein are not to be limited in scope by the specific examples herein disclosed since these examples are intended as illustrations of several aspects of the embodiments. Any equivalent examples are intended to be within the scope of the embodiments. Indeed, various modifications of the embodiments in addition to those shown and described herein will become apparent to those skilled in the art from the foregoing description. Such modifications are also intended to fall within the scope of the appended claims. All references including patents, patent applications and publications cited herein are incorporated herein by reference in their entirety and for all purposes to the same extent as if each individual publication or patent or patent application was specifically and individually indicated to be incorporated by reference in its entirety for all purposes.

The invention claimed is:

1. A stand-off chemical detector for detecting one or more materials on a target, the detector comprising:
    a pulsed supercontinuum (SC) laser source generating a source pulse beam emitting a spectral band of approximately 2 to 12 μm for target illumination;
    an interferometric device for spectrally modulating the source pulse beam;
    an optical transmitter for directing the spectrally modulated source pulse beam to the target and sampling the source pulse beam to obtain a source reference measurement signal;
    an optical receiver for collecting a reflected source pulse beam from the target and the source reference measurement signal from the optical transmitter;
    at least one infrared detector for detecting the target reflected source pulse beam and the source reference measurement signal as a series of interferograms;
    an internal reference laser for generating an internal reference laser signal for collection of fringe timing data from the series of interferograms;
    a digitizer for digitizing the interferograms; and
    a processor for producing spectrograms from the digitized interferograms and fringe timing data, wherein the spectrograms are indicative of one or more materials on the target.

2. The stand-off chemical detector of claim 1, the processor using the fringe timing data to calculate a full Fourier transform matrix, wherein each term is given by the formula:

$$F(v,\alpha) = e^{-i\pi v \times OPD(\alpha, n(v))}$$

further wherein, $v$ is the wavenumber in $cm^{-1}$ and $\alpha$ is a refractor angle associated with each interferogram, and $n(v)$ is the wavenumber-dependent index of refraction of the refractor.

3. The stand-off chemical detector of claim 1, further comprising a thermal camera to facilitate directing of the spectrally modulate source pulse beam to the target.

4. The stand-off chemical detector of claim 1, wherein the interferometric device is a refraction-based Fourier transform infrared (FTIR) spectrometer.

5. The stand-off chemical detector of claim 1, wherein the infrared detector is a high-bandwidth photoconductive mercury/cadmium telluride (MCT) system.

6. The stand-off chemical detector of claim 1, wherein the digitizer is a two-channel digitizer, wherein a first channel digitizes output from the detector and a second channel digitizes the internal reference laser signal from the interferometric device.

7. A stand-off chemical detector for detecting one or more materials on a target, the detector comprising:
    a pulsed supercontinuum (SC) laser source generating a source pulse beam emitting a spectral band of approximately 2 to 12 μm for target scanning;
    an interferometric device for spectrally modulating the source pulse beam prior to interaction with the target;
    a transmitter for directing the spectrally modulated source pulse beam to the target and sampling the source pulse beam to obtain a source reference measurement signal;
    a receiver for collecting a reflected source pulse beam from the target and the source reference measurement signal from the optical transmitter;
    a detector for receiving the reflected source pulse beam and the source reference measurement signal, wherein the reflected source pulse beam includes spectral information for detecting one or more materials on the target and further wherein the detector outputs a series of interferograms;
    an internal reference laser for generating an internal reference laser signal for collection of fringe timing data from the series of interferograms;
    a processor for providing indications of one or more materials on the target using at least the interferograms and fringe timing data.

8. The stand-off chemical detector of claim 7, further comprising a thermal camera to facilitate scanning of the target with the modulated source pulse beam.

9. The stand-off chemical detector of claim 7, wherein the interferometric device is a refraction-based Fourier transform infrared (FTIR) spectrometer.

10. The stand-off chemical detector of claim 7, wherein the detector is a high bandwidth photoconductive mercury/cadmium telluride (MCT) system.

11. A process for scanning a target area located at a distance of at least 3 meters from a stand-off detector to detect one or more materials thereon, the process comprising:
    scanning the target area in a grid configuration with a source pulse beam emitting a spectral band of approximately 2 to 12 μm generated by a supercontinuum (SC) laser source, wherein prior to reaching the target area, the source pulse beam is spectrally modulated by a refraction-based interferometric modulator and sampled by an optical component to obtain a source reference measurement signal;

receiving at an optical receiver a reflected source pulse beam from the target area and the source reference measurement signal from the optical component;

detecting by at least one infrared detector the target reflected source pulse beam from the target area and the source reference measurement signal source reference measurement signal as a series of interferograms;

detecting an internal continuous wave reference beam generated by an internal diode laser, wherein the internal continuous wave reference beam is used for collection of fringe timing data from the series of interferograms;

digitizing the interferograms by a digitizer; and processing the interferograms and fringe timing data to produce spectrograms to detect the inclusion of one or more materials in the target area.

12. The process according to claim 11, further comprising scanning the target area at multiple different times to generate multiple different scans, wherein when a first of the multiple different scans results in a target area reflectance that saturates the digitizer, a gain setting on the digitizer is dynamically adjusted until a next of the multiple different scans does not saturate the digitizer.

13. The process according to claim 11, wherein scanning the target area is completed over a 15 second measurement period.

* * * * *